(12) United States Patent
Sugiura et al.

(10) Patent No.: US 7,012,496 B2
(45) Date of Patent: Mar. 14, 2006

(54) NOISE ELIMINATION DEVICE AND METHOD FOR INSTALLING THE SAME

(75) Inventors: Toshihiro Sugiura, Nisshin (JP);
Masahiro Otsu, Nisshin (JP);
Shigemitsu Toriyama, Nisshin (JP);
Junichi Inaguma, Nisshin (JP);
Kazuyoshi Nakayama, Nisshin (JP);
Akira Hayakawa, Nisshin (JP)

(73) Assignee: Masproh Denkoh Co., Ltd.

( * ) Notice: Subject to any disclaimer, the term of this patent is extended or adjusted under 35 U.S.C. 154(b) by 551 days.

(21) Appl. No.: 09/879,405

(22) Filed: Jun. 12, 2001

(65) Prior Publication Data
US 2001/0050605 A1    Dec. 13, 2001

(51) Int. Cl.
*H01F 27/02* (2006.01)
(52) U.S. Cl. .................. 336/92; 336/90; 336/174
(58) Field of Classification Search ............ 336/92, 336/174, 175, 192, 132, 61, 90; 324/207, 324/509; 29/602.1
See application file for complete search history.

(56) References Cited

U.S. PATENT DOCUMENTS

| | | | | |
|---|---|---|---|---|
| 4,543,554 A | * | 9/1985 | Muellenheim et al. | 336/83 |
| 5,091,707 A | * | 2/1992 | Wollmerschauser et al. | 333/12 |
| 5,847,628 A | * | 12/1998 | Uchikoba et al. | 333/204 |
| 6,710,673 B1 | * | 3/2004 | Jokerst | 333/12 |

* cited by examiner

*Primary Examiner*—Anh T. Mai
(74) *Attorney, Agent, or Firm*—Pearson & Pearson, LLP (57) ABSTRACT

The invention provides a noise elimination device that can be installed easily on a coaxial cable and that can effectively eliminate noise from both the center conductor and the outer conductor. Coaxial connectors 2 and 3 are provided on both ends of a tube-shaped housing 1 made of an insulator, and a coil made by winding a coaxial cable of thin diameter is around an open magnetic ferrite core is disposed inside the housing 1 and connected to the connectors 2 and 3 at the two ends. The earth-side connector thickness of the outer conductor of the coaxial cable and the connector as well as all earth-side conductors, such as shield members 7 connecting the connectors with the outer conductors of the coaxial cable, is at least 0.1 mm.

91 Claims, 9 Drawing Sheets

NOISE ELIMINATION DEVICE AND METHOD FOR INSTALLING THE SAME

BACKGROUND OF THE INVENTION

1. Field of the Invention

The present invention relates to a noise elimination device interposed in a coaxial cable in order to reduce noise entering a signal transmission line using the coaxial cable, as well as to a method for installing such a noise elimination device.

2. Description of the Related Art

In bi-directional CATV systems, in which television signals are sent from a central office to subscriber homes and signals are also transmitted from the subscriber homes to the central office, an upward signal frequency of 10 MHz to 55 MHz is often used for signals transmitted from the subscriber homes to the central office. However, the frequency of electromagnetic waves of noise generated by electronic household appliances lies in this frequency band as well, so that due to the electromagnetic waves generated by these electric household appliances, noise is incurred into the upward signal, and the problem of streamed noise affecting the central office side arises.

Therefore, ways to extinguish this noise have been studied, and noise generated in the center conductor of the coaxial cable was countered by providing a highpass filter, whereas noise generated in the outer conductor serving as the ground conductor was countered by providing a noise elimination unit as disclosed for example in JP H07-297035A. This noise elimination unit includes a coil made by winding a coaxial cable around a ring-shaped closed magnetic ferrite core, wherein the core conductor of that coaxial cable is connected in series with the core conductor of the coaxial cable to be installed, whereas its outer conductor is connected to the outer conductor of the coaxial cable to be installed, and the noise elimination unit is inserted between a relay amplifier and the cable.

However, to eliminate noise from both the center conductor and the outer conductor, a unit with a highpass filter and a noise elimination unit in which a coaxial cable is wound around a ferrite are both necessary, and their assembly is troublesome, and even providing both does not necessarily lead to a good noise elimination effect.

Furthermore, in CATV backbones, a large current for equipment operation is often transmitted over the coaxial cable, overlapping with the signal, and in that case, if the noise elimination unit disclosed in the above-mentioned publication is used in such a CATV backbone, then the coaxial cable wound around the ferrite core has to be a cable with large diameter, which can carry that current, which makes it difficult to wind around a ferrite ring, and even if it can be wound, the coil will be large, because the curvature of the coil cannot be made small, so that the unit itself becomes large and thus unsuitable for practice. Therefore, it cannot be installed easily in existing CATV facilities.

Moreover, to improve the noise elimination effect, the coil should have a large inductance with respect to the noise, and in the afore-mentioned upward signal frequency band, which is relatively low, it is necessary to wind the coaxial cable in many turns around the ferrite ring, so that also in this respect, the unit becomes large.

In view of these problems, it is an object of the first aspect of the present invention to provide a noise elimination device, which can be easily installed in a coaxial cable, and which can effectively eliminate noise from both the center conductor and the outer conductor, as well as a method for installing such a noise elimination device. It is an object of the fifth aspect of the present invention to provide a small noise elimination device that can be set up easily, even with a coaxial cable carrying a large current in superposition.

SUMMARY OF THE INVENTION

In order to achieve these objects, a noise elimination device in accordance with a first aspect of the present invention includes:

a housing provided with coaxial connectors on both ends; and a noise elimination circuit arranged inside the housing;

wherein a ground conductor thickness of a coupling portion coupling the noise elimination circuit with the coaxial connectors is at least twice a skin depth due to the skin effect at a transmission signal frequency.

According to a second aspect of the present invention, in a noise elimination device in accordance with the first aspect of the present invention, the noise elimination circuit includes a coil made by winding a coaxial cable around at least one of an open magnetic core and a closed magnetic core.

According to a third aspect of the present invention, in a noise elimination device in accordance with the second aspect of the present invention, the noise elimination device further includes a highpass filter arranged in series with the coil.

According to a fourth aspect of the present invention, a method for installing a noise elimination device in accordance with the third aspect of the present invention includes placing the coil closer to a noise generating side than the highpass filter when installing the noise elimination device in a signal transmission line including a coaxial cable.

According to a fifth aspect of the present invention, in a noise elimination device in accordance with the first aspect of the present invention, the noise elimination circuit is made by coupling the core conductors of the two coaxial connectors via a first coil wound around a ferrite core, coupling the outer conductors of the two coaxial connectors via a second coil wound around the ferrite core, inserting a capacitor on at least one of the two sides of both the first and second coil, providing a first choke coil in parallel with the first coil and the capacitor provided on the side of the first coil, and providing a second choke coil in parallel with the second coil and the capacitor provided on the side of the second coil.

According to a sixth aspect of the present invention, in a noise elimination device in accordance with any of the first, third and fifth aspect of the present invention, one of the coaxial connectors is a plug connector and the other coaxial connector is a jack connector.

According to a seventh and an eighth aspect of the present invention, in a noise elimination device in accordance with any of the first, third, fifth and sixth aspect of the present invention, the housing is substantially tube-shaped and the two ends of the housing are insulated from one another.

According to a ninth and tenth aspect of the present invention, in a noise elimination device in accordance with any of the first, third, fifth and sixth aspect of the present invention, the two coaxial connectors are formed each in independent housings, the two housings are connected with a coaxial cable, and the coil is provided in one of the two housings.

According to an eleventh to sixteenth aspect of the present invention, in a noise elimination device in accordance with any of the first, third, fifth, ninth and tenth aspect of the present invention, the first and the second coil are made by serially winding around two ferrite cores, wherein one ferrite core is a closed magnetic ferrite core and the other ferrite core is an open magnetic ferrite core.

According to a seventeenth to twenty-eighth aspect of the present invention, in a noise elimination device in accordance with any of the first, third, fifth and eleventh through sixteenth aspect of the present invention, a conductor of the first coil is made of a center conductor and a conductor of the second coil is made of an outer conductor covering the center conductor, so that the coil conductors are arranged as a coaxial cable.

According to a twenty-ninth to fortieth aspect of the present invention, in a noise elimination device in accordance with any of the first, third, fifth and eleventh through sixteenth aspect of the present invention, the ferrite core orthogonally intersects with a substrate, and the coil is formed by pattern formation of a coil conductor on the substrate in a shape that is wound around the ferrite core.

According to a forty-first to sixty-fourth aspect of the present invention, a noise elimination device in accordance with any of the first, third, fifth and twenty-ninth through fortieth aspect of the present invention further includes a transformer connected in series to the coil.

According to a sixty-fifth to eighty-second aspect of the present invention, in a noise elimination device in accordance with any of the first, third, fifth, eleventh through sixteenth, and twenty-ninth through fortieth aspect of the present invention, the closed magnetic core is made of a plurality of cut cores.

BRIEF DESCRIPTION OF THE DRAWINGS

FIGS. 2(*a*) and 2(*b*) are diagrams of noise elimination circuits built into the noise elimination device shown in FIG. 1.

FIG. 5(*a*) is an exterior view, and FIG. 5(*b*) is a cross-sectional view.

DESCRIPTION OF THE PREFERRED EMBODIMENTS

Figure 1:
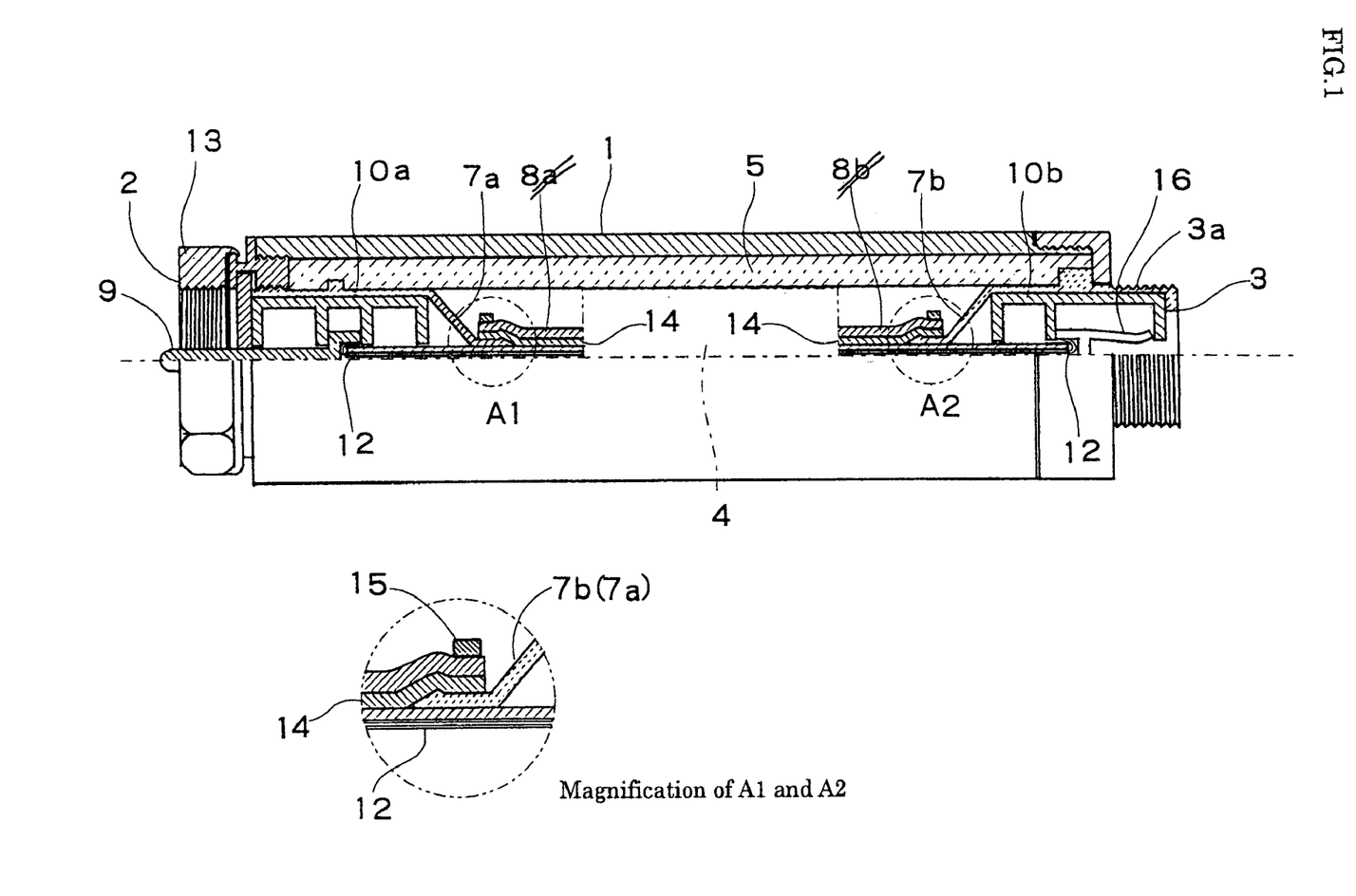
FIG. 1 shows a first embodiment of a noise elimination device in accordance with the present invention and is a lateral view showing the upper half of the device in a cross section.

The following is a description of concrete embodiments of the present invention, with reference to the accompanying drawings. FIG. 1 shows a first embodiment of a noise elimination device in accordance with the present invention. FIG. 1 is a lateral view showing the upper half of the device above the center axis in a cross section. In FIG. 1, numeral 1 denotes a tube-shaped housing accommodating a noise elimination circuit 4, numeral 2 denotes a coaxial connector having a female thread (referred to as "jack connector" in the following), and numeral 3 denotes a coaxial connector having a male thread (referred to as "plug connector" in the following), arranged respectively at the apertures at both ends of the housing 1.

On the inner side of the housing 1, a retention tube 5, which is made of an insulating material like the housing 1 and retains the noise elimination circuit 4, is provided, and cylindrical shield members 7*a* and 7*b* coupled to outer conductors of the connectors 2 and 3 are mounted at both ends of the retention tube 5. The shield members 7*a* and 7*b* are constricted in funnel-shape in inward direction with respect to the retention tube and connected to a coaxial cable 8 of narrow diameter extending from the noise elimination circuit 4. The shield members 7*a* and 7*b* are made of a metal with high conductivity.

The one shield member 7*a* that is connected to the jack connector 2 is provided with a retention member 10*a* made of an insulating material, which retains a central contact 9 of the connector 2 inside, and as the central contact 9 of the connector 2 is being held, it is connected to a center conductor 12 of the coaxial cable 8.

The other shield member 7*b* is formed in one piece with the plug connector 3 and the outer conductor, that is, the threaded portion 3*a*, and is provided inside with a retention member 10*b* made of an insulating material, which retains a central contact (center conductor holding pin) 16 of the connector 3 is provided inside the shield member 7*b*, and as the central contact 16 of the connector 3 is being provided, it is connected to the center conductor 12 of the coaxial cable 8.

The thickness of the ground conductors, such as the threaded portion of the plug connector 3, the coupling portion coupling the female thread 13, which is an outer conductor of the jack connector 2, with the housing 1, the shield members 7*a* and 7*b*, and the outer conductor 14 of the coaxial cable 8, is in all cases at least 0.1 mm.

It should be noted that at the portion where the shield members 7*a* and 7*b* are connected to the outer conductor 14 of the coaxial cable 8, the shield members 7*a* and 7*b* are inserted into the outer conductor 14 of the coaxial cable 8, and a tight connection is achieved by clamping with a ferrule 15, as shown in the magnification of A1 and A2.

Here, the ground conductors are at least four times thicker than the skin depth at the frequency of the transmitted signal. The skin depth h of, for example, copper due to the skin effect is given by the equation $h = 0.066/\sqrt{f}$ (wherein f is the frequency in MHz)

According to this formula, when the transmission signal frequency is 10 MHz, then h=0.02087 mm. Therefore, by making all ground conductor portions at least 0.1 mm, their thickness is at least four times the skin depth.

In this manner, by setting the thickness of the ground conductors to at least four times the skin depth, noise near the transmission signal frequency that is induced into the ground conductors flows only at the skin of the ground conductors, and does not flow inside anymore. Therefore, since the ground conductor side components of the transmission signal flow at the inner side of the ground conductors, noise is prevented from overlapping with the transmission signal itself. Consequently, providing the noise elimination device does not cause new noise.

However, as has been determined experimentally, although the effect of making the ground conductors at least four times thicker than the skin depth achieves a larger effect when the length of the signal transmission line is prolonged by interposing a coaxial cable for example, in a noise elimination device with relatively short signal transmission line as shown in FIG. 1, external noise does not overlap with the transmission signal itself even when the thickness is only about twice the skin thickness, attaining a sufficient effect.

Figure 2:
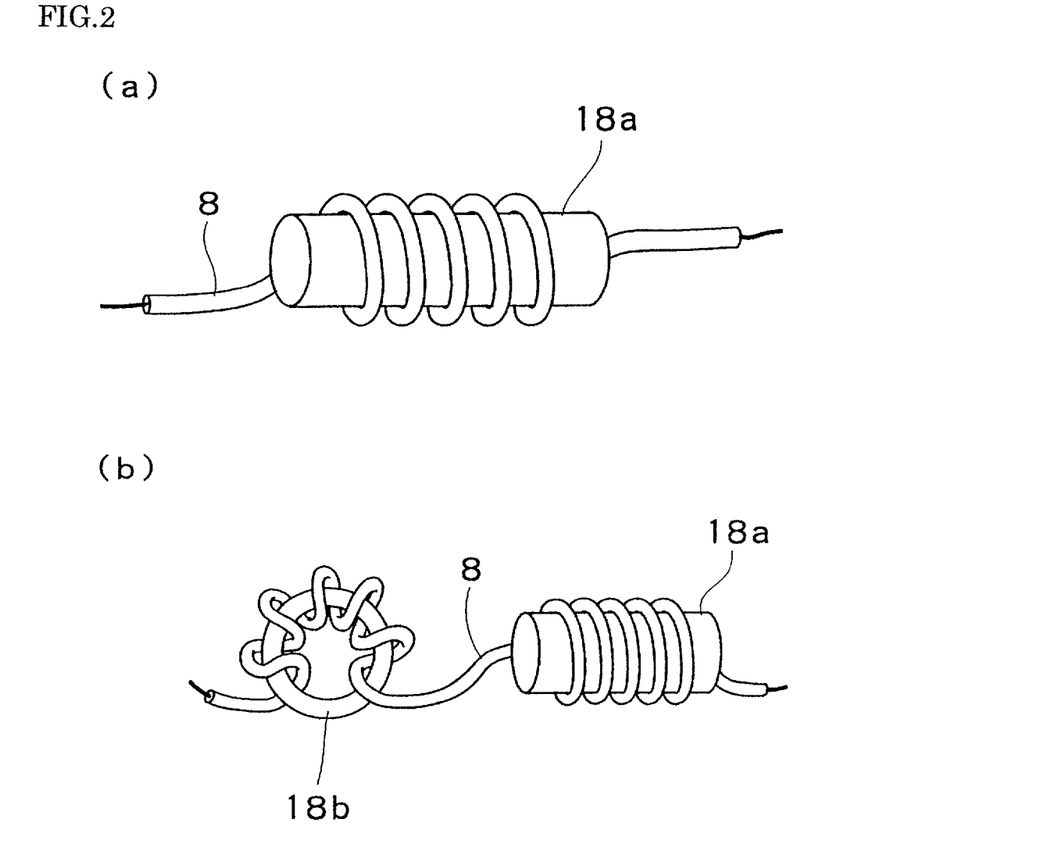

FIG. 2 shows examples of the noise elimination circuit 4. As shown in FIG. 2, this noise elimination circuit 4 is made of a coil made by winding a thin coaxial cable 8. The noise elimination circuit 4 can be made by winding the coaxial cable 8 around a rod-shaped open magnetic ferrite core 18a, as shown in FIG. 2(a), or by winding the coaxial cable 8 around a closed magnetic ferrite core 18b and connecting this coil in series with the coil of 2(a), as shown in FIG. 2(b).

Figure 10:
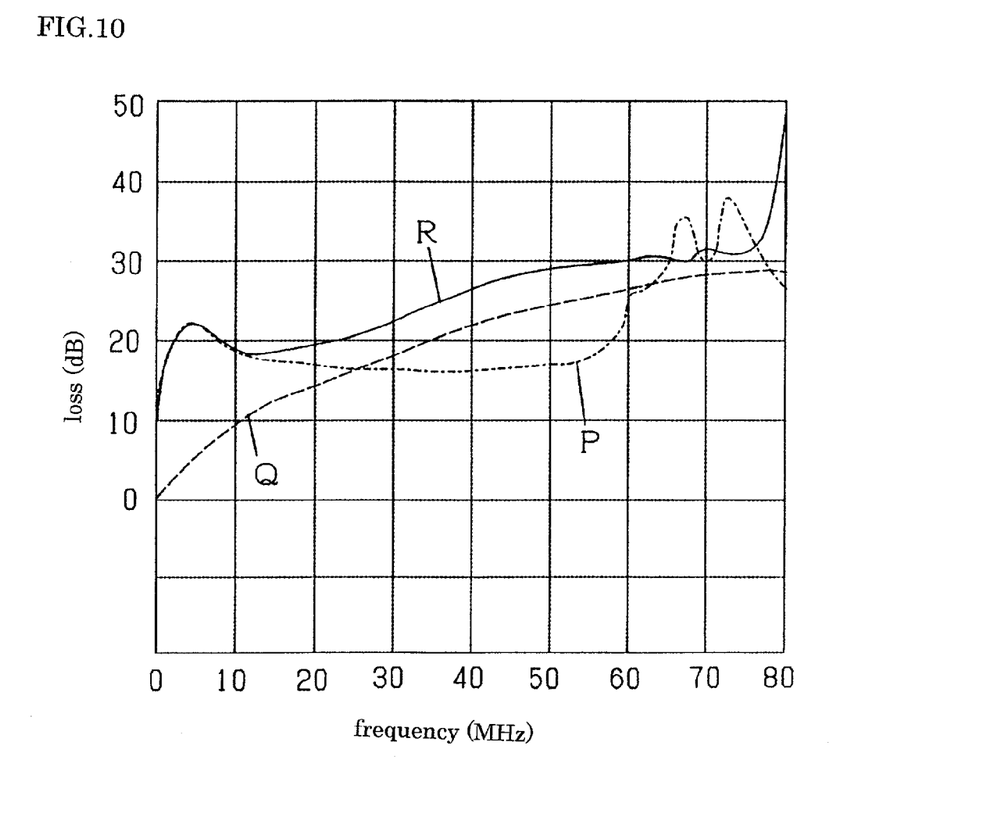
FIG. 10 is a graph showing the loss characteristics of the coil in FIG. 2(*b*).

The noise elimination characteristics (loss characteristics) of the coils in FIG. 2 are shown in FIG. 10. In FIG. 10, P denotes the characteristics of the coil made of only a closed magnetic path, Q denotes the characteristics of the coil made of only an open magnetic path, and R denotes the characteristics of the two coils connected in series. For the closed magnetic ferrite core in FIG. 10, a 35T0375-30P by STEWARD was used, around which a 1C coaxial cable was wound in eight turns, whereas for the open magnetic ferrite core, an NB25Sφ6×20 mm by Hitachi Metals, Ltd. was used, with a winding number of 20 turns.

As shown in FIG. 10, using for the coil a coil made of a closed magnetic ferrite core or an open magnetic ferrite core, or using the two coils connected in series prevents the noise flowing in the outer conductor (ground conductor) from entering the center conductor. In particular at the frequency band of 10 MHz to 55 MHz, at which streamed noise in CATV becomes a problem, noise can be eliminated effectively with a closed magnetic coil and an open magnetic coil connected in series. It should be noted that the noise elimination circuit can also be made with a closed magnetic core around which a coaxial coil is wound.

Figure 3:
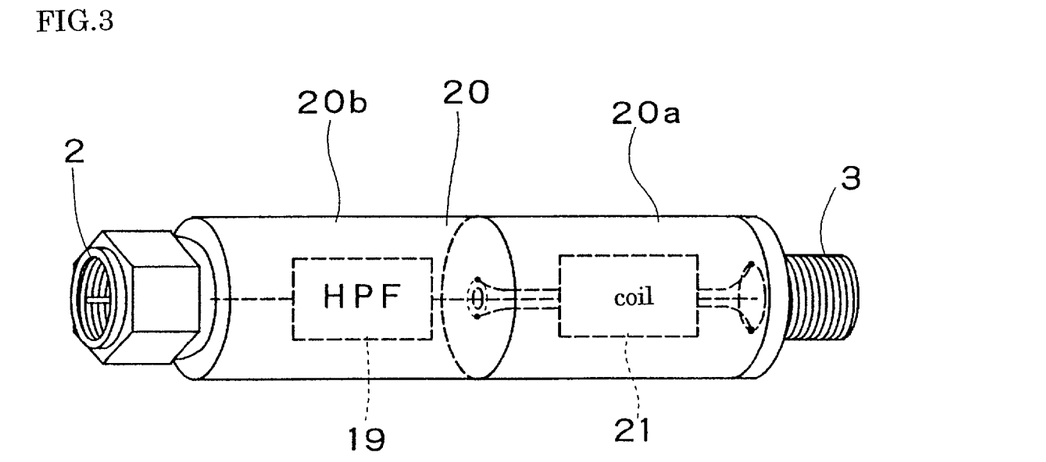
FIG. 3 is a block diagram showing another example of a noise elimination circuit built into the noise elimination device shown in FIG. 1.

FIG. 3 is an exterior sketch of another example of a noise elimination circuit, made by connecting a highpass filter 19 (referred to as "HPF" in the following) in series to a coil as describe above. In this case, the housing 20 accommodating the circuit has a coil portion 20a and a HPF portion 20b, which are formed independently. The coil portion 20a of the housing is made of an insulator, and accommodates a noise elimination circuit 21 made of a coil as shown in FIG. 2. The HPF portion 20b of the housing is made of a conductor and is provided with a shield space inside. The HPF 19 is built into the HPF portion 20b.

The HPF 19 is for example a circuit combining a capacitor and a coil, and cuts frequencies below 10 MHz. The HPF 19 effectively extinguishes noise that has entered the center conductor.

Thus, additionally providing a HPF, it is possible to extinguish noise that has entered the center conductor, and in combination with a coil, it is possible to largely extinguish the noise induced to both the outer conductor and the center conductor.

The noise elimination device in FIG. 3, which is provided with both a coil and a HPF, should be installed such that the coil is arranged on the side of the noise source, for example on the side of the subscriber's home when it is arranged in the signal transmission path of a CATV system, or on the side of the terminal device when it is arranged in the subscriber's home.

If the HPF 19 is arranged on the side of the noise source, then a portion of the noise that enters the outer conductor enters the center conductor by mode conversion in the HPF 19, and even if the noise in the outer conductor is eliminated afterwards with the noise elimination circuit 21 made of a coil, the noise of the center conductor will sometimes remain without being eliminated. However by first eliminating the noise in the outer conductor with the noise elimination circuit 21, noise will not enter the center conductor from the outer conductor in the HPF 19, so that there is a larger effect of noise reduction.

Thus, arranging the HPF and the coil in a specified order, the noise carried by the center conductor and the outer conductor can be eliminated efficiently, and by installing only one device of the present invention, noise can be eliminated from both the center conductor and the outer conductor, so that it is not necessary anymore to install a plurality of devices, and the installation becomes easier.

It should be noted that there is no particular problem in reversing the arrangement of the plug connector and the jack connector in this embodiment. Furthermore, in this embodiment, the coaxial connectors are F-type connectors, but they can also be FT- or M-type connectors. Furthermore, the portion connecting the coil portion and the HPF portion of the housing can also be a linking structure using the aforementioned coaxial connectors, and in this case, the attachment/detachment operation becomes easier while maintaining a sturdy connection, the combination of HPF and coil can be changed easily, and it is easy to form a device with the desired characteristics.

Figure 4:
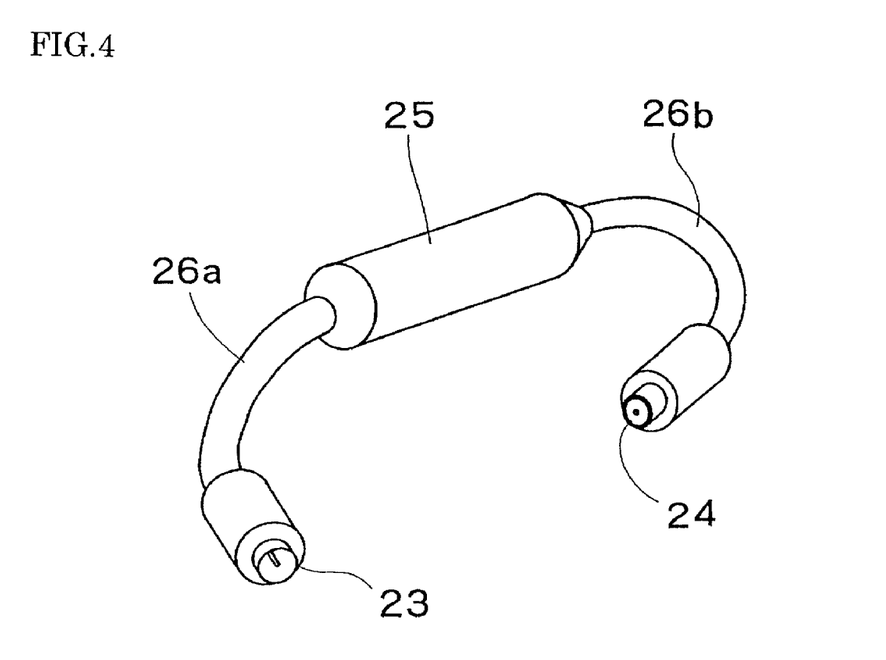
FIG. 4 is an exterior view of a noise elimination device showing another example of the present invention.

FIG. 4 shows another example of a noise elimination device. This device is different from the above-described embodiments in that the connector on one side is an F-type plug 23, the connector on the other side is an F-type jack 24 corresponding to the F-type plug, and both connectors are separated from a main unit 25 by coaxial cables 26a and 26b extending from the main unit 25.

If coaxial cables are interposed between the housing and the connectors in this manner so that the connector portions can be arranged with greater flexibility, then, when directly connecting the device to, for example, an indoor CATV terminal, the device can be installed easily without protruding outward very far, and without posing a hindrance.

In the above embodiments, one of the coaxial connectors is a plug-type connector, whereas the other one is a jack-type connector, but it is also possible to make them both plug-type connectors or make them both jack-type connectors. Furthermore, in a system, in which the installed signal transmission line also transmits power, it is also possible to provide a current-carrying circuit arranged in parallel to the HPF and the coil.

Figure 5:
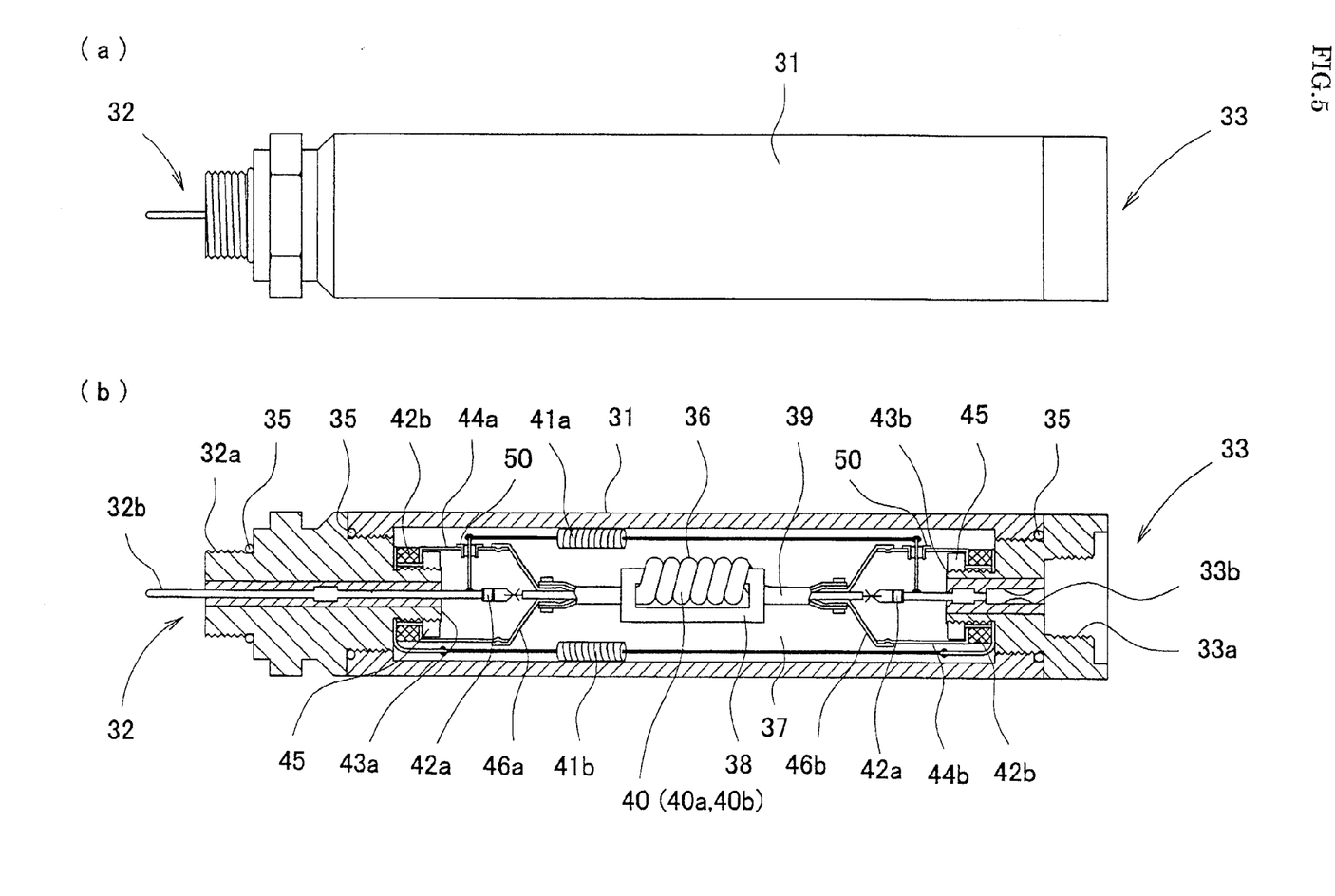
FIG. 5 shows a second embodiment of a noise elimination device in accordance with the present invention.

FIG. 5 shows a second embodiment of a noise elimination device in accordance with the present invention. FIG. 5(a) is an exterior view, and FIG. 5(b) is a cross-sectional view. In FIG. 5, numeral 32 denotes a coaxial connector made of an FT-type plug (referred to as "plug connector" in the following), and numeral 33 denotes a coaxial connector made of an FT-type jack (referred to as "jack connector" in the following). Both connectors are coupled and fixed by screwing them into the two terminal apertures of a tube-shaped housing 31 that is made of plastic and provided with a circuit formation portion 37 inside, and both connectors 32 and 33 are insulated from one another. Moreover, the coupling portions are provided with rubber O-rings 35, which shield the inside of the tube from rainwater.

The coaxial connectors 32 and 33 respectively include threaded coupling portions 32a and 33a, which serve also as the outer conductor connection portion, and core conductor connection pins 32b and 33b provided at the center of the threaded coupling portions 32a and 33a. The base ends of the core conductor connection pins 32b and 33b project inward from the ends of the coaxial connectors 32 and 33 that are inside the housing, and they are connected via chip capacitors 42a to the core of a coaxial cable 39 of a noise elimination circuit 36.

Moreover, the threaded coupling portions 32a and 33a, which are electrically coupled to the outer conductor of the connected coaxial cable, have male threaded portions 43a and 43b arranged to protrude into the housing 31. After fitting ring-type lead-through capacitors 42b on them, the base portions of tube-shaped shield fittings 44a and 44b are fitted, and fastened with nuts 45 made of an insulating material. The threaded coupling portions 32a and 33a are electrically coupled with the shield fittings 44a and 44b via the capacitors 42b.

The shield fittings 44a and 44b are further connected at their front ends to funnel-shaped metal shield plugs 46a and 46b and connected without a gap to the outer conductor of the coaxial cable 39 that forms the noise elimination circuit 36.

The noise elimination circuit 36 includes a coil 40 made of a coaxial cable 39 of narrow diameter that is wound around a substantially rectangular closed magnetic ferrite core 38, and the coil 40 is made of a first coil 40a constituted by the core conductor of the coaxial cable 39 and a second coil 40b constituted by the outer conductor of the coaxial cable 39.

The core conductors and the outer conductors of the two coaxial conductors 32 and 33 are respectively coupled by a first choke coil 41a and a second choke coil 41b, preventing the passage of the transmission signal but letting through low frequency or dc operating currents. The first choke coil 41a is connected in parallel to the first coil 40a and the two chip capacitors 42a, whereas the second choke coil 41b is connected in parallel to the second coil 40b and the two ring-type lead-through capacitors 42b. It should be noted that the connection of the first choke coil 41a is performed by providing the shield fittings 44a and 44b with lead-through terminals 50, and leading lead lines connected to the core conductor connection pins 32b and 33b through those lead-through terminals 50.

Thus, the core conductors as well as the outer conductors of the connectors are coupled by the coils (via the capacitors) and the choke coils. The capacitors 42a and 42b are cut capacitors preventing the passage of an operating current overlapping with the transmission signal, whereas the choke coils 41a and 41b cut the transmission signal frequencies and let an operating current through, so that they are made by winding a thick conductor around a ferrite.

As in the above-described embodiment, the thickness of the ground conductors, such as the portions coupling the plug connector 32 and the jack connector 33 with the housing 31, the shield fittings 44a and 44b, the shield plugs 46a and 46b, and the outer conductor of the coaxial cable 39, is in all cases at least 0.1 mm.

With such a noise elimination device, current can be blocked without the occurrence of new noise, even when the connected cable also carries the operating current of the equipment in superimposition. Moreover, a small ferrite core can be used, so that the noise elimination device can be made compact. Therefore, the noise elimination device can installed at a signal cable connection, connecting for example a coaxial cable with the equipment, and can be fitted easily to existing equipment.

Moreover, the first coil and the second coil are made of the core conductor and the outer conductor of a coaxial cable, so that noise induced to the outer conductor can be extinguished efficiently, and the attenuation of the transmission signal at the coil portion can be kept small. Furthermore, both connectors are arranged on one straight line, so that the noise elimination device can be made resistant to stress, and can also be used at locations susceptible to external forces, such as tensile forces.

The closed magnetic path core does not necessarily have to be formed in one piece, and can also be formed by combining a plurality of cut cores into a circular or rectangular closed magnetic path, which makes it possible to reduce costs.

Figure 6:
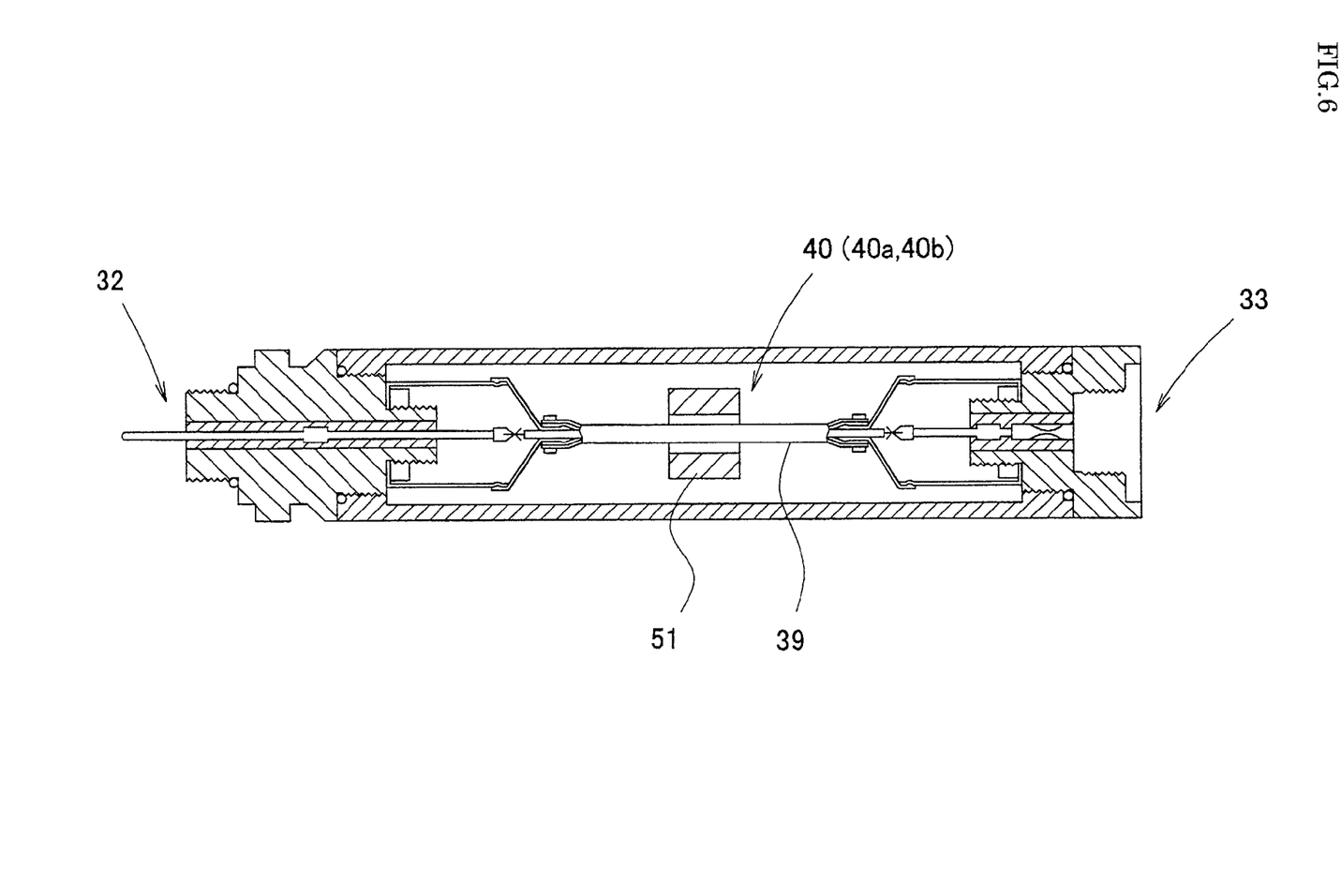
FIG. 6 is a cross-sectional view showing a third embodiment of a noise elimination device in accordance with the present invention.

FIG. 6 shows a third embodiment of the present invention, which differs from the embodiment of FIG. 5 with respect to the configuration of the noise elimination circuit. The difference is that no choke coil and no capacitor are provided, and the coil 40 (40a and 40b) is not formed by winding around a ferrite core, but by simply passing the coaxial cable 39 through a closed magnetic ferrite core 51.

This simple circuit configuration can be used when no current or a low current is superimposed on the connected coaxial cable.

Figure 7:
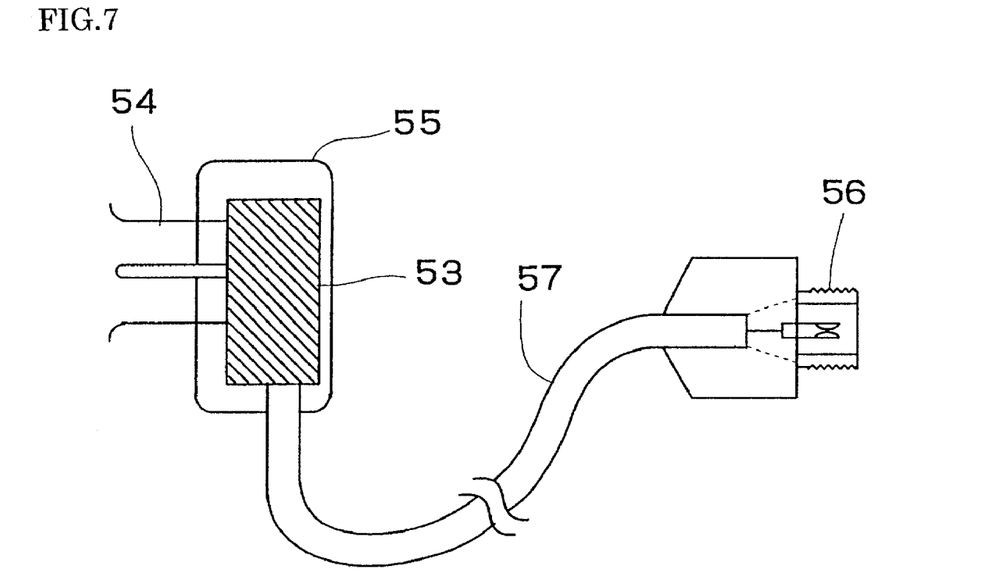
FIG. 7 is a simplified cross-sectional view showing a fourth embodiment of a noise elimination device in accordance with the present invention.

FIG. 7 shows a fourth embodiment of the present invention. In FIG. 7, the hatched portion 53 indicates the portion where the noise elimination circuit is formed. The noise elimination circuit is coupled to a plug terminal inside a housing 55 having a plug connector 54 and is also connected via a coaxial cable 57 to a jack connector 56.

Thus, the distance between the two connection terminals can be made longer by interposing a coaxial cable, and for example if the noise elimination device is used indoors, it is possible to connect, for example, a series unit and the equipment without connecting a separate coaxial cable. Especially, if the coaxial cable is provided at a right angle with respect to the connection direction, as shown in FIG. 7, then, when connecting to a series unit for example, the protrusion amount of the plug housing can be made small, and it is possible to connect a wall terminal with a stand-alone apparatus on little space.

Moreover, by making the plug connector an F-type plug, and making the jack connector and F-type receptor, it is possible to directly connect an indoors series unit and to use the noise elimination device indoors. In that case, the F-type plug can also be a thread-less push-on plug, but it can also be a hexagonal or a knurled plug. Moreover, by making the jack connector an F-type plug connector, it is possible to connect it directly to a terminal device, such as a television receiver, without using a separate connection cable or adapter, such as an F-plug to F-plug for example.

Figure 12:
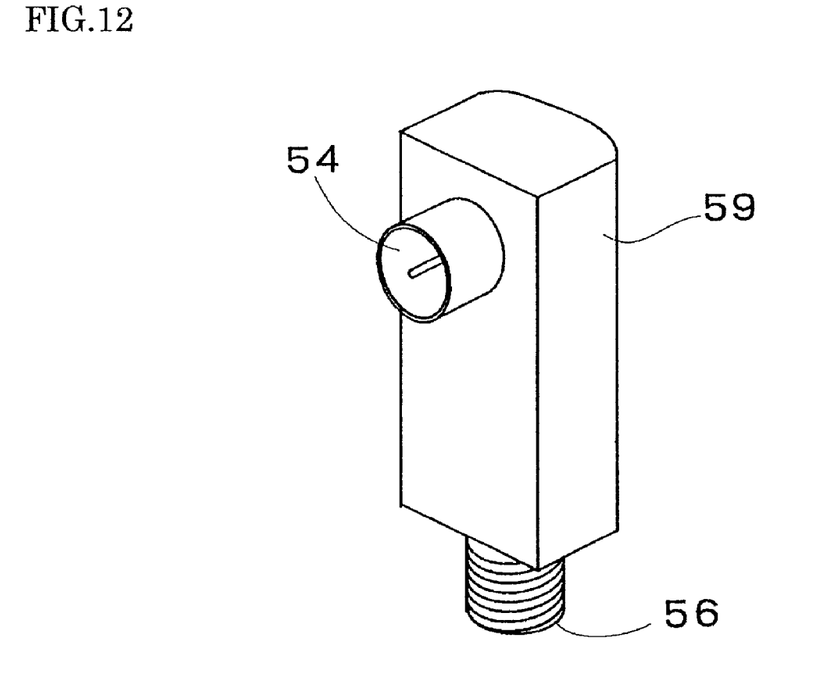
FIG. 12, which shows another embodiment of the present invention, is an exterior view of a noise elimination device, in which the connection terminals are arranged at right angles.

FIG. 12 shows a modification of FIG. 7. As shown in FIG. 12, it is also possible to arrange a plug connector 54 and a jack connector 56 at right angles with respect to one another in a housing 59 accommodating a noise elimination circuit, without interposing a coaxial cable. With this arrangement, as in FIG. 7, when connecting a series unit for example, the protrusion amount can be made small, and installation is easy, even when there is little connection space.

Figure 8:
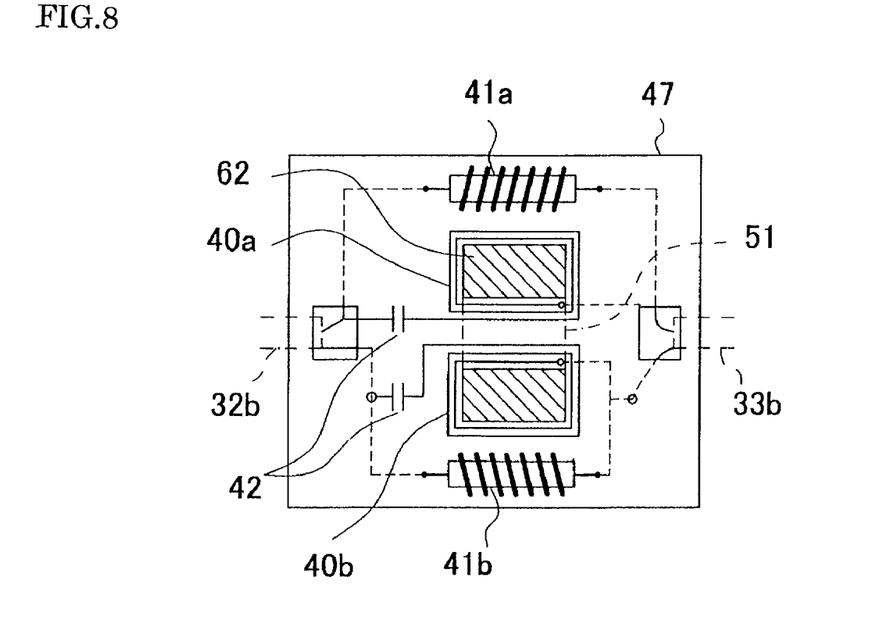
FIG. 8, which shows another example of a noise elimination circuit, is a plan view of a circuit board with a coil conductor made by pattern formation on the circuit board.

FIG. 8, which shows another example of a noise elimination circuit, is a diagram of a noise elimination circuit assembled on a circuit board. The choke coils 41a and 41b and the capacitor 42 are assembled on a printed circuit board 47, and the coil conductors of the coils 40a and 40b are made by pattern formation. At the portions where the coils are formed, holes 62 for inserting a ferrite core are formed at two locations, and the closed magnetic ferrite core 51 is mounted perpendicular on the substrate. The closed magnetic ferrite core 51 is made by joining two semicircular ferrite cores through the holes 62 in the substrate 47. Thus, the first coil 40a and the second coil 40b are formed independently, and the coil conductors are made by symmetric pattern formation. Also, one capacitor 42 each is provided for the first coil 40a and the second coil 40b.

Thus, it is also possible to arrange the capacitors on the substrate and to form the first and the second coils separately, and in this case, pattern formation on the substrate is possible, and the coil formation is simplified.

Figure 9:
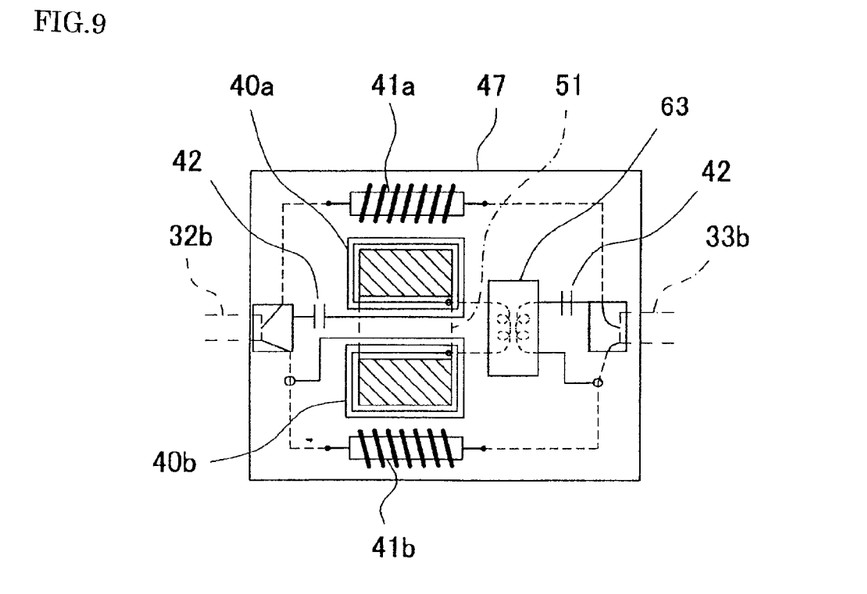
FIG. 9, which shows another example of a noise elimination circuit, is a plan view of a circuit board with a coil conductor made by pattern formation on the circuit board.

FIG. 9 shows an example of another noise elimination circuit. The coil 40 is made by pattern formation on the printed circuit board 47, and a transformer 63 is provided in series with the coil 40. Combining a transformer with the coil in this manner, makes it possible to eliminate noise even more effectively. In this circuit, the capacitors 42 are provided at two locations, namely on one side of the first coil 40a and on the core conductor side of the secondary winding of the transformer 63.

Figure 11:
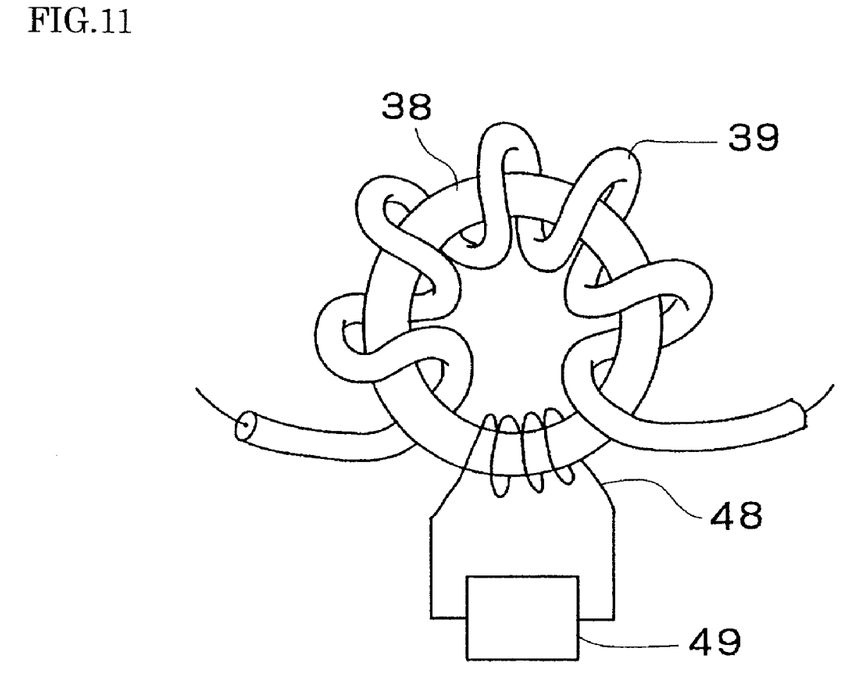
FIG. 11 is an exterior view showing another embodiment of a coil, which is provided with an auxiliary winding.

It should be noted that if two ferrite cores are used to make a two-stage coil, then the noise elimination characteristics can also be improved by using two closed magnetic ferrite cores, but as mentioned above, it is effective to use two different types of cores. Also, when making the coil of one closed magnetic ferrite core, it is possible to improve the characteristics by providing an auxiliary winding made by independently winding for example a polyurethane line 48 around the closed magnetic ferrite core 38, in addition to the coaxial cable 39, as shown in FIG. 11 and connecting for example a resistive load 49 to the polyurethane line 48. Moreover, in the above embodiments, one coaxial connector is a plug connector whereas the other one is a jack connector, but it is also possible to devise both as plug connectors or both as jack connectors.

Figure 13:
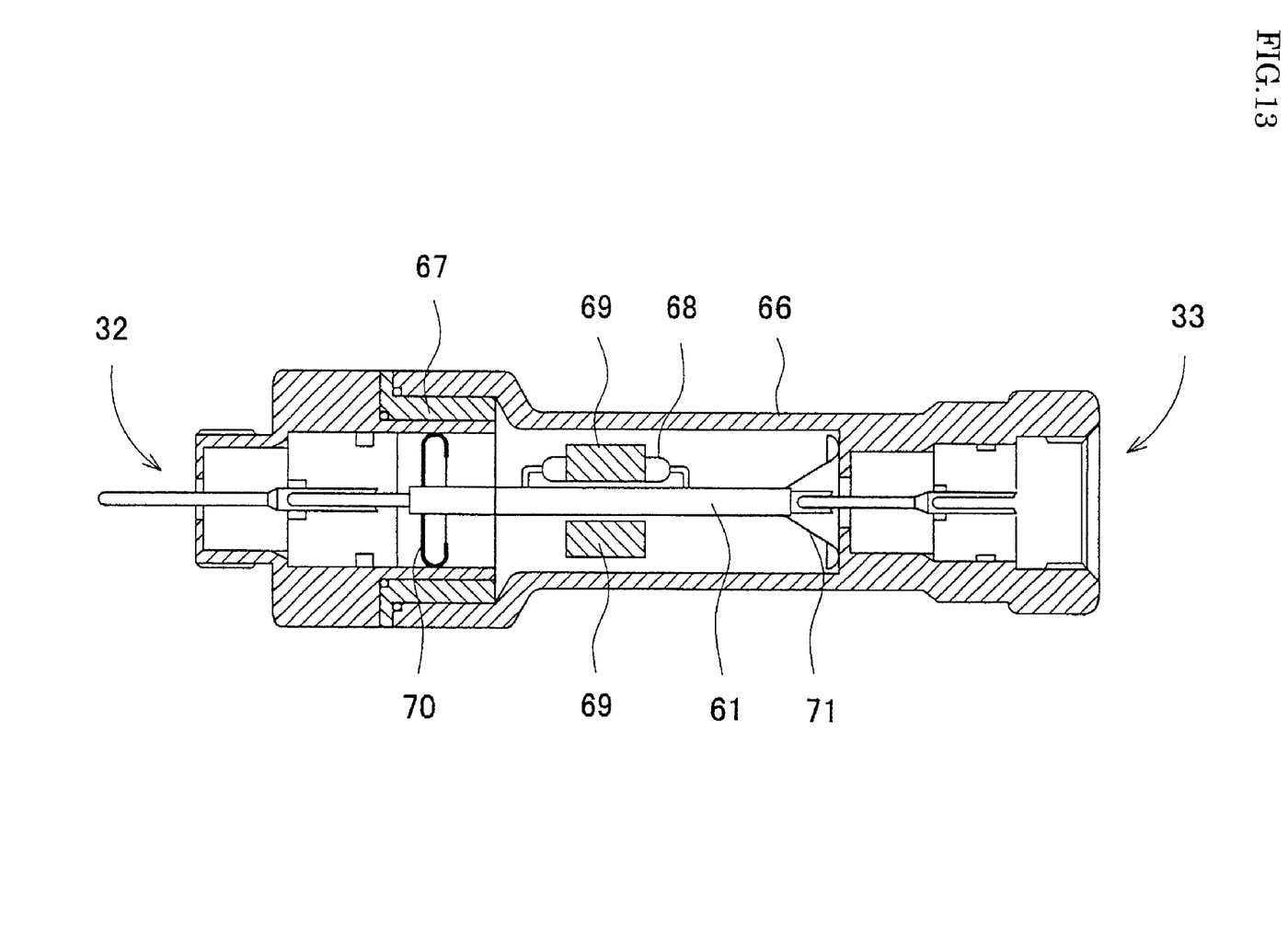
FIG. 13 is a cross-sectional view of a noise elimination device in a fifth embodiment of the present invention.

FIG. 13 shows a fifth embodiment of a noise elimination device in accordance with the present invention. Here, the housing is made of a metal tube 66, the coaxial connectors 32 and 33 are coupled with an insulator 67 interposed between them. Thus, the tube can be made of metal, which makes it possible to increase the strength of the housing. Moreover, the noise elimination circuit is formed on a printed circuit board 61 and accommodated inside the housing. In FIG. 13, numeral 68 denotes a choke coil, numeral 69 denotes a ferrite core, numeral 70 denotes a ground fitting connecting a ground portion on one side of the printed circuit board 61 with the plug connector 32, numeral 71 denotes a ground fitting connecting a ground portion the other side of the printed circuit board 61 with the jack connector 33. The two ground fittings are formed across the entire circumference of the printed circuit board, so that they shield the printed circuit board.

As has been explained above, with a noise elimination device in accordance with the first aspect of the present invention, the thickness of the ground conductors is at least twice the skin depth, and transmission signal frequency noise that is induced in the outer conductor flows only at the skin of the outer conductor, and does not occur on the inner side, so that the signal can flow on the inner side of the outer conductor, noise will not overlap with the transmission signal itself, new noise is not caused by the noise elimination device, and noise can be effectively eliminated from both the center conductor and the outer conductor.

With the second aspect of the present invention, in addition to the effects of the first aspect of the present invention, the noise induced in the outer conductor can be effectively prevented from entering the core conductor, and noise can be prevented from corrupting the signal.

With the third aspect of the present invention, both the noise carried by the center conductor and the noise carried by the outer conductor of the coaxial cable can be eliminated, and the installation operation is easy.

With the method for installing a noise elimination device according to the fourth aspect of the present invention, the coil eliminates noise reliably from the outer conductor, and noise is effectively eliminated.

With the fifth aspect of the present invention, in addition to the effects of the first aspect of the present invention, even when the cable to be connected carries a current in superposition, the operating current is not interrupted, and since a small ferrite core can be used, the noise elimination device can be made compact. With the sixth aspect of the present invention, it can be installed at the connection portion connecting a coaxial cable and an apparatus, so that it can be easily attached to existing equipment.

With the seventh and eighth aspect of the present invention, both connectors are arranged on a straight line, so that a sturdy housing can be formed, and the device can be used without difficulty at places susceptible to tensile forces. With the ninth and tenth aspect of the present invention, by interposing a coaxial cable, especially when arranging the coaxial cable and the connector at right angles, the protrusion amount of the connector portion can be made small, and it is possible to connect a wall terminal with a stand-alone apparatus on little space. Moreover, it is possible to connect an apparatus and a series unit without interposing a separate coaxial cable.

With the eleventh through sixteenth aspect of the present invention, noise is eliminated with coils in a two-stage arrangement, so that the noise can be eliminated even more effectively. With the seventeenth through twenty-eighth aspect of the present invention, noise induced in the outer conductor can be extinguished effectively and the attenuation of the transmission signal can be reduced.

With the twenty-ninth through fortieth aspect of the present invention, the coil conductors are made by pattern formation on a substrate, so that the coils can be manufactured easily. With the forty-first through sixty-fourth aspect of the present invention, noise can be removed even more effectively. With the sixty-fifth through eighty-eighth aspect of the present invention, the closed magnetic core can be made at low cost.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A noise elimination device, comprising:
   a housing provided with coaxial connectors on both ends; and
   a noise elimination circuit arranged inside the housing;
   wherein a ground conductor thickness of a coupling portion coupling the noise elimination circuit with the coaxial connectors is at least twice a skin depth of current flowing due to the skin effect at a high transmission signal frequency.

2. The noise elimination device according to claim 1, wherein the noise elimination circuit includes a coil made by winding a coaxial cable around at least one of an open magnetic core and a closed magnetic core, or both an open magnetic core and a closed magnetic core connected in series.

3. The noise elimination device according to any of claim 2, further comprising a transformer connected in series to the coil.

4. The noise elimination device according to claim 1, wherein the noise elimination circuit includes a coil. made by winding a coaxial cable around at least one of an open magnetic core and a closed magnetic core.

5. The noise elimination device according to claim 4 further comprising a transformer connected in series with the coil.

6. The noise elimination device according to claim 4, wherein the coaxial connectors are formed each in independent housings, the independent housings are connected with a coaxial cable, and the coil is provided in one of the independent housings.

7. The noise elimination device according to claim 6, further comprising a transformer connected in series to the coil.

8. The noise elimination device according to claim 4, wherein the housing is substantially tube-shaped and the two ends of the housing are insulated from one another.

9. The noise elimination device according to claim 8, further comprising a transformer connected in series to the coil.

10. The noise elimination device according to claim 4, wherein one of the coaxial connectors is a plug connector and the other coaxial connector is a jack connector.

11. The noise elimination device according to claim 10, further comprising a transformer connected in series to the coil.

12. The noise elimination device according to claim 10 wherein the housing is substantially tube-shaped and the two ends of the housings are insulated from one another.

13. The noise elimination device according to claim 12, further comprising a transformer connected in series to the coil.

14. The noise elimination device according to claim 1, wherein the noise elimination circuit is made by coupling the core conductors of the coaxial connectors via a first coil wound around a ferrite core, coupling the outer conductors of the two coaxial connectors via a second coil wound around the ferrite core, inserting a capacitor on at least one of the two sides of both the first and second coil, providing a first choke coil in parallel with the first coil and the capacitor provided on the side of the first coil, and providing a second choke coil in parallel with the second coil and the capacitor provided on the side of the second coil.

15. The noise elimination device according to claim 14 further comprising a transformer connected in series to the coil.

16. The noise elimination device according to claim 14, wherein the ferrite core orthogonally intersects with a substrate, and the coil is formed by pattern formation of a coil conductor on the substrate in a shape that is wound around the ferrite core.

17. The noise elimination device according to claim 14, wherein a conductor of the first coil is made of a center conductor and a conductor of the second coil is made of an outer conductor covering the center conductor, so that the coil conductors are arranged as a coaxial cable.

18. The noise elimination device according to claim 17, further comprising a transformer connected in series to the coil.

19. The noise elimination device according to claim 17, wherein the closed magnetic core is made of a plurality of cut cores.

20. The noise elimination device according to claim 14, wherein the first and the second coil are made by serially winding around two ferrite cores, wherein one ferrite core is a closed magnetic ferrite core and the other ferrite core is an open magnetic ferrite core.

21. The noise elimination device according to claim 20, further comprising a transformer connected in series to the coil.

22. The noise elimination device according to claim 20, wherein the ferrite core orthogonally intersects with a substrate, and the coil is formed by pattern formation of a coil conductor on the substrate in a shape that is wound around the ferrite core.

23. The noise elimination device according to claim 20, wherein the closed magnetic core is made of a plurality of cut cores.

24. The noise elimination device according to claim 20, wherein a conductor of the first coil is made of a center conductor and a conductor of the second coil is made of an outer conductor covering the center conductor, so that the coil conductors are arranged as a coaxial cable.

25. The noise elimination device according to claim 24, further comprising a transformer connected in series to the coil.

26. The noise elimination device according to claim 24, wherein the closed magnetic core is made of a plurality of cut cores.

27. The noise elimination device according to claim 14, wherein one of the coaxial connectors is a plug connector and the other coaxial connector is a jack connector.

28. The noise elimination device according to claim 27, wherein a conductor of the first coil is made of a center conductor and a conductor of the second coil is made of an outer conductor covering the center conductor, so that the coil conductors are arranged as a coaxial cable.

29. The noise elimination device according to claim 28, further comprising a transformer connected in series to the coil.

30. The noise elimination device according to claim 28, wherein the closed magnetic core is made of a plurality of cut cores.

31. The noise elimination device according to claim 27 wherein the housing is substantially tube-shaped and the two ends of the housings are insulated from one another.

32. The noise elimination device according to claim 31, wherein a conductor of the first coil is made of a center conductor and a conductor of the second coil is made of an outer conductor covering the center conductor, so that the coil conductors are arranged as a coaxial cable.

33. The noise elimination device according to claim 32, wherein the closed magnetic core is made of a plurality of cut cores.

34. The noise elimination device according to claim 32, further comprising a transformer connected in series to the coil.

35. The noise elimination device according to claim 31, wherein the first coil and the second coil are made by serially winding around two ferrite cores, wherein one ferrite core is a closed magnetic ferrite core and the other ferrite core is an open magnetic ferrite core.

36. The noise elimination device according to claim 35, wherein the ferrite core orthogonally intersects with a substrate, and the coil is formed by pattern formation of a coil conductor on the substrate in a shape that is wound around the ferrite core.

37. The noise elimination device according to claim 35, further comprising a transformer connected in series to the coil.

38. The noise elimination device according to claim 35, wherein the closed magnetic core is made of a plurality of cut cores.

39. The noise elimination device according to claim 35, wherein a conductor of the first coil is made of a center conductor and a conductor of the second coil is made of an outer conductor covering the center conductor, so that the coil conductors are arranged as a coaxial cable.

40. The noise elimination device according to claim 39, further comprising a transformer connected in series to the coil.

41. The noise elimination device according to claim 39, wherein the closed magnetic core is made of a plurality of cut cores.

42. The noise elimination device according to claim 14, wherein the housing is substantially tube-shaped and the two ends of the housing are insulated from one another.

43. The noise elimination device according to claim 42, wherein a conductor of the first coil is made of a center conductor and a conductor of the second coil is made of an outer conductor covering the center conductor, so that the coil conductors are arranged as a coaxial cable.

44. The noise elimination device according to claim 43, further comprising a transformer connected in series to the coil.

45. The noise elimination device according to claim 43, wherein the closed magnetic core is made of a plurality of cut cores.

46. The noise elimination device according to claim 42, wherein the ferrite core orthogonally intersects with a substrate, and the coil is formed by pattern formation of a coil conductor on the substrate in a shape that is wound around the ferrite core.

47. The noise elimination device according to claim 1, wherein one of the coaxial connectors is a plug connector and the other coaxial connector is a jack connector.

48. The noise elimination device according to claim 47, wherein the ferrite core orthogonally intersects with a substrate, and the coil is formed by pattern formation of a coil conductor on the substrate in a shape that is wound around the ferrite core.

49. The noise elimination device according to claim 47, wherein the housing is substantially tube-shaped and the two ends of the housing are insulated from one another.

50. The noise elimination device according to claim 49, wherein the ferrite core orthogonally intersects with a substrate, and the coil is formed by pattern formation of a coil conductor on the substrate in a shape that is wound around the ferrite core.

51. The noise elimination device according to claim 47, wherein the plug connector and the jack connector are formed each in independent housings, the independent housings are connected with a coaxial cable, and the coil is provided in one of the independent housings.

52. The noise elimination device according to claim 51, wherein the ferrite core orthogonally intersects with a substrate, and the coil is formed by pattern formation of a coil conductor on the substrate in a shape that is wound around the ferrite core.

53. The noise elimination device according to claim 51, comprises a transformer connected in series to the coil.

54. The noise elimination device according to claim 51, wherein a conductor of the first coil is made of a center conductor and a conductor of the second coil is made of an outer conductor covering the center conductor, so that the coil conductors are arranged as a coaxial cable.

55. The noise elimination device according to claim 54, further comprising a transformer connected in series to the coil.

56. The noise elimination device according to claim 54, wherein the closed magnetic core is made of a plurality of cut cores.

57. The noise elimination device according to claim 51, wherein the first and the second coil are made by serially winding around two ferrite cores, wherein one ferrite core is a closed magnetic ferrite core and the other ferrite core is an open magnetic ferrite core.

58. The noise elimination device according to claim 57, wherein the ferrite core orthogonally intersects with a substrate, and the coil is formed by pattern formation of a coil conductor on the substrate in a shape that is wound around the ferrite core.

59. The noise elimination device according to claim 57, wherein the closed magnetic core is made of a plurality of cut cores.

60. The noise elimination device according to claim 57, further comprising a transformer connected in series to the coil.

61. The noise elimination device according to claim 57, wherein a conductor of the first coil is made of a center conductor and a conductor of the second coil is made of an outer conductor covering the center conductor, so that the coil conductors are arranged as a coaxial cable.

62. The noise elimination device according to claim 61, wherein the closed magnetic core is made of a plurality of cut cores.

63. The noise elimination device according to claim 61, further comprising a transformer connected in series to the coil.

64. The noise elimination device according to claim 47, wherein the first coil and the second coil are made by serially winding around two ferrite cores, wherein one ferrite core is a closed magnetic ferrite core and the other ferrite core is an open magnetic ferrite core.

65. The noise elimination device according to claim 64, further comprising a transformer connected in series to the coil.

66. The noise elimination device according to claim 64, wherein the closed magnetic core is made of a plurality of cut cores.

67. The noise elimination device according to claim 64, wherein the ferrite core orthogonally intersects with a substrate, and the coil is formed by pattern formation of a coil conductor on the substrate in a shape that is wound around the ferrite core.

68. The noise elimination device according to claim 64, wherein a conductor of the first coil is made of a center conductor and a conductor of the second coil is made of an outer conductor covering the center conductor, so that the coil conductors are arranged as a coaxial cable.

69. The noise elimination device according to claim 68, wherein the closed magnetic core is made of a plurality of cut cores.

70. The noise elimination device according to claim 68, further comprising a transformer connected in series to the coil.

71. The noise elimination device according to claim 1, wherein the housing is substantially tube-shaped and the two ends of the housing are insulated from one another.

72. The noise elimination device according to claim 71, wherein the first coil and the second coil are made by serially winding around two ferrite cores, wherein one ferrite core is a closed magnetic ferrite core and the other ferrite core is an open magnetic ferrite core.

73. The noise elimination device according to claim 72, wherein the ferrite core orthogonally intersects with a substrate, and the coil is formed by pattern formation of a coil conductor on the substrate in a shape that is wound around the ferrite core.

74. The noise elimination device according to claim 72, further comprising a transformer connected in series to the coil.

75. The noise elimination device according to claim 72, wherein a conductor of the first coil is made of a center conductor and a conductor of the second coil is made of an outer conductor covering the center conductor, so that the coil conductors are arranged as a coaxial cable.

76. The noise elimination device according to claim 75, further comprising a transformer connected in series to the coil.

77. The noise elimination device according to claim 75, wherein the closed magnetic core is made of a plurality of cut cores.

78. The noise elimination device according to claim 72, wherein the closed magnetic core is made of a plurality of cut cores.

79. The noise elimination device according to claim 14, wherein the coaxial connectors are formed each in independent housings, the independent housings are connected with a coaxial cable, and the coil is provided in one of the independent housings.

80. The noise elimination device according to claim 79, wherein the ferrite core orthogonally intersects with a substrate, and the coil is formed by pattern formation of a coil conductor on the substrate in a shape that is wound around the ferrite core.

81. The noise elimination device according to claim 79, wherein a conductor of the first coil is made of a center conductor and a conductor of the second coil is made of an outer conductor covering the center conductor, so that the coil conductors are arranged as a coaxial cable.

82. The noise elimination device according to claim 81, further comprising a transformer connected in series to the coil.

83. The noise elimination device according to claim 81, wherein the closed magnetic core is made of a plurality of cut cores.

84. The noise elimination device according to claim 79, wherein the first coil and the second coil are made by serially winding around two ferrite cores, wherein one ferrite core is a closed magnetic ferrite core and the other ferrite core is an open magnetic ferrite core.

85. The noise elimination device according to claim 84, further comprising a transformer connected in series to the coil.

86. The noise elimination device according to claim 84, wherein the closed magnetic core is made of a plurality of cut cores.

87. The noise elimination device according to claim 84, wherein the ferrite core orthogonally intersects with a substrate, and the coil is formed by pattern formation of a coil conductor on the substrate in a shape that is wound around the ferrite core.

88. The noise elimination device according to claim 84, wherein a conductor of the first coil is made of a center conductor and a conductor of the second coil is made of an outer conductor covering the center conductor, so that the coil conductors are arranged as a coaxial cable.

89. The noise elimination device according to claim 88, further comprising a transformer connected in series to the coil.

90. The noise elimination device according to claim 88, wherein the closed magnetic core is made of a plurality of cut cores.

91. The noise elimination device according to any of claim 1, wherein the two coaxial connectors are formed each in independent housings, the independent housings are connected with a coaxial cable, and a coil of said noise elimination circuit is provided in one of the independent housings.

* * * * *